United States Patent [19]

Uchida et al.

[11] Patent Number: 4,767,363
[45] Date of Patent: Aug. 30, 1988

[54] CONTROL DEVICE FOR MARINE ENGINE

[75] Inventors: Tatsuki Uchida; Katsumi Torigai, both of Hamamatsu, Japan

[73] Assignee: Sanshin Koygo Kabushiki Kaisha, Hamamatsu, Japan

[21] Appl. No.: 936,336

[22] Filed: Dec. 1, 1986

Related U.S. Application Data

[63] Continuation-in-part of Ser. No. 906,329, Sep. 11, 1986.

[30] Foreign Application Priority Data

Nov. 30, 1985 [JP] Japan .............................. 60-268285

[51] Int. Cl.⁴ ............................................ B63H 23/00
[52] U.S. Cl. ......................................... 440/1; 440/84; 114/144 E
[58] Field of Search .................. 440/87, 900, 6, 7, 84, 440/1, 2; 114/144 E, 144 R, 144 A; 123/400–403, 413; 74/480 B; 180/283

[56] References Cited

U.S. PATENT DOCUMENTS

| 3,002,487 | 10/1961 | Didsbury | 180/283 |
| 3,183,879 | 5/1965 | Heidner | 440/87 |
| 3,676,648 | 7/1972 | Wesner | 114/144 E |
| 4,008,781 | 2/1977 | Ochiai | 180/283 |
| 4,643,149 | 2/1987 | Dunham et al. | 440/87 |

Primary Examiner—Joseph F. Peters, Jr.
Assistant Examiner—Stephen P. Avila
Attorney, Agent, or Firm—Ernest A. Beutler

[57] ABSTRACT

A control system for a watercraft that presents the existence of more than a predetermined degree of acceleration when the watercraft is being steered through a substantial steering angle.

17 Claims, 4 Drawing Sheets

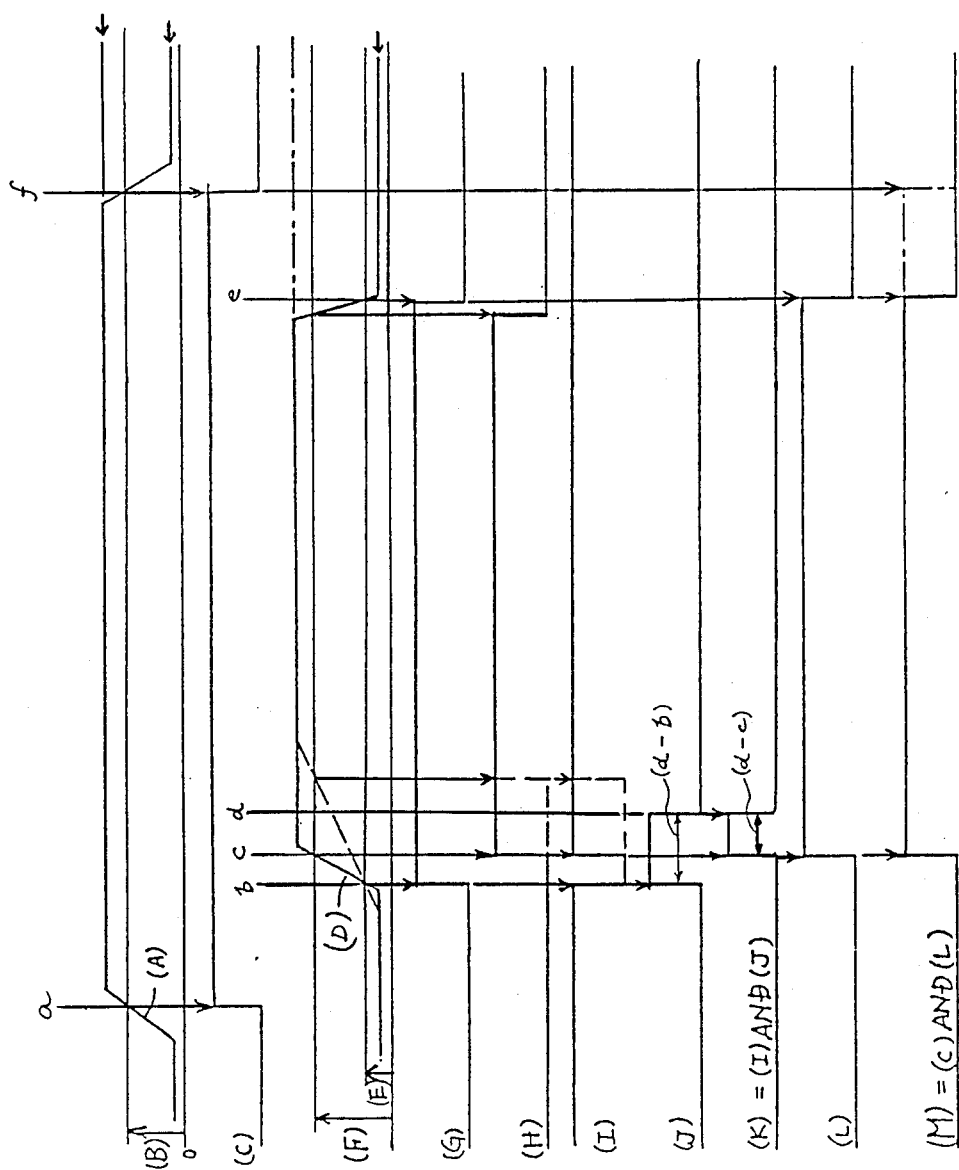

CONTROL DEVICE FOR MARINE ENGINE

CROSS REFERENCE TO RELATED APPLICATION

This application is a continuation-in-part of our application of the same title, Ser. No. 906,329, filed Sept. 11, 1986 and assigned to the assignee of this application.

BACKGROUND OF THE INVENTION

This invention relates to a control device for a marine engine and more particularly to a control device for interrelating the acceleration and steering of a watercraft.

In a watercraft, it is desirable to prevent too rapid an acceleration when the watercraft is being steered at a relatively large angle. Such a sudden power application can cause discomfort to the occupants and also may cause the watercraft to be steered more rapidly than the operator desires. This is particularly true when the watercraft is powered by an outboard drive wherein the steering of the watercraft is achieved by pivotal movement of the outboard drive. If too sudden a driving thrust is applied when the steering angle is steep, the watercraft may steer through a greater angle than is desired by the operator.

It is, therefore, a principal object of this invention to provide an arrangement wherein the sudden application of power to a watercraft being steered more than a predetermined angle is prevented.

It is another object of the invention to provide an arrangement for interrelating the steering and power controls of a watercraft so that sudden applications of power cannot be applied if the watercraft is being steered through greater than a predetermined angle.

It is yet a further object of the invention to provide an improved control device for a watercraft wherein the steering and power controls are interrelated so that more than a predetermined steering angle and more than a predetermined power output cannot exist simultaneously.

SUMMARY OF THE INVENTION

A first feature of this invention is adapted to be embodied in a watercraft having a drive carrying propulsion means and supported for pivotal movement about a steering axis. An engine is provided for driving the propulsion means and, in accordance with this feature of the invention, means are provided for limiting the output of the engine when the drive is steered through greater than a predetermined angle.

Another feature of the invention may be embodied in a watercraft having a drive that is supported for pivotal movement and an engine for driving the drive as set forth in the preceding paragraph. In accordance with this feature of the invention, means are provided for limiting the acceleration of the watercraft when the drive is steered through greater than a predetermined angle.

Another feature of the invention is adapted to be embodied in a vehicle that has steering means for steering the vehicle and first control means for controlling the steering means. An engine is provided for powering the vehicle and second control means control the output of the engine. In accordance with this feature of the invention, safety means are provided for controlling at least one of the control means for precluding the existence of more than a predetermined steering angle and more than a predetermined engine output at the same time.

Yet another feature of the invention is also adapted to be embodied in a vehicle having steering means for steering the vehicle and engine means for powering the vehicle with respective first and second control means as set forth in the preceding paragraph. In accordance with this feature of the invention, safety means are provided for controlling at least one of the control means for precluding the existence of more than a predetermined steering angle and more than a predetermined vehicle acceleration at the same time.

BRIEF DESCRIPTION OF THE DRAWINGS

FIG. 4 is a graphical analysis showing the outputs of the signals of the system shown in FIG. 3 to explain its method of operation.

DETAILED DESCRIPTION OF THE PREFERRED EMBODIMENTS

Figure 1:
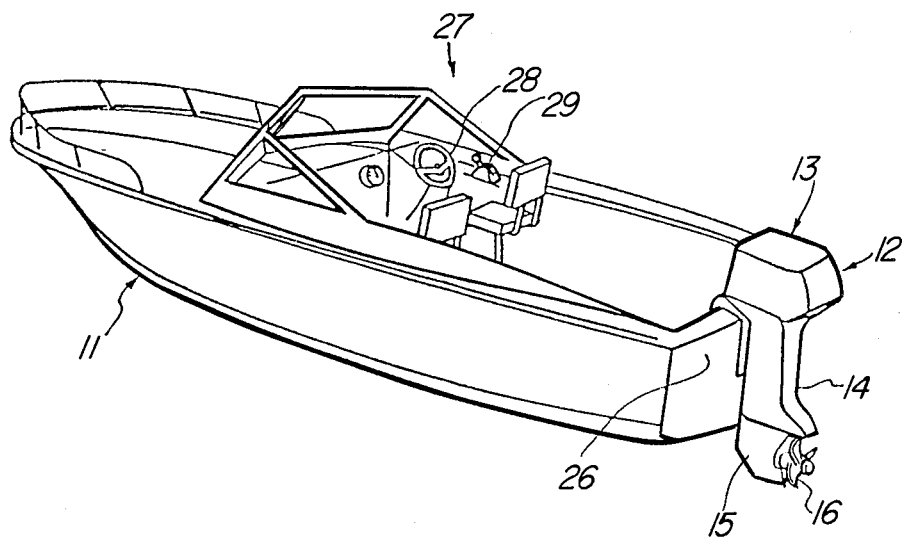
FIG. 1 is a perspective view of a watercraft constructed in accordance with an embodiment of the invention.
Figure 2:
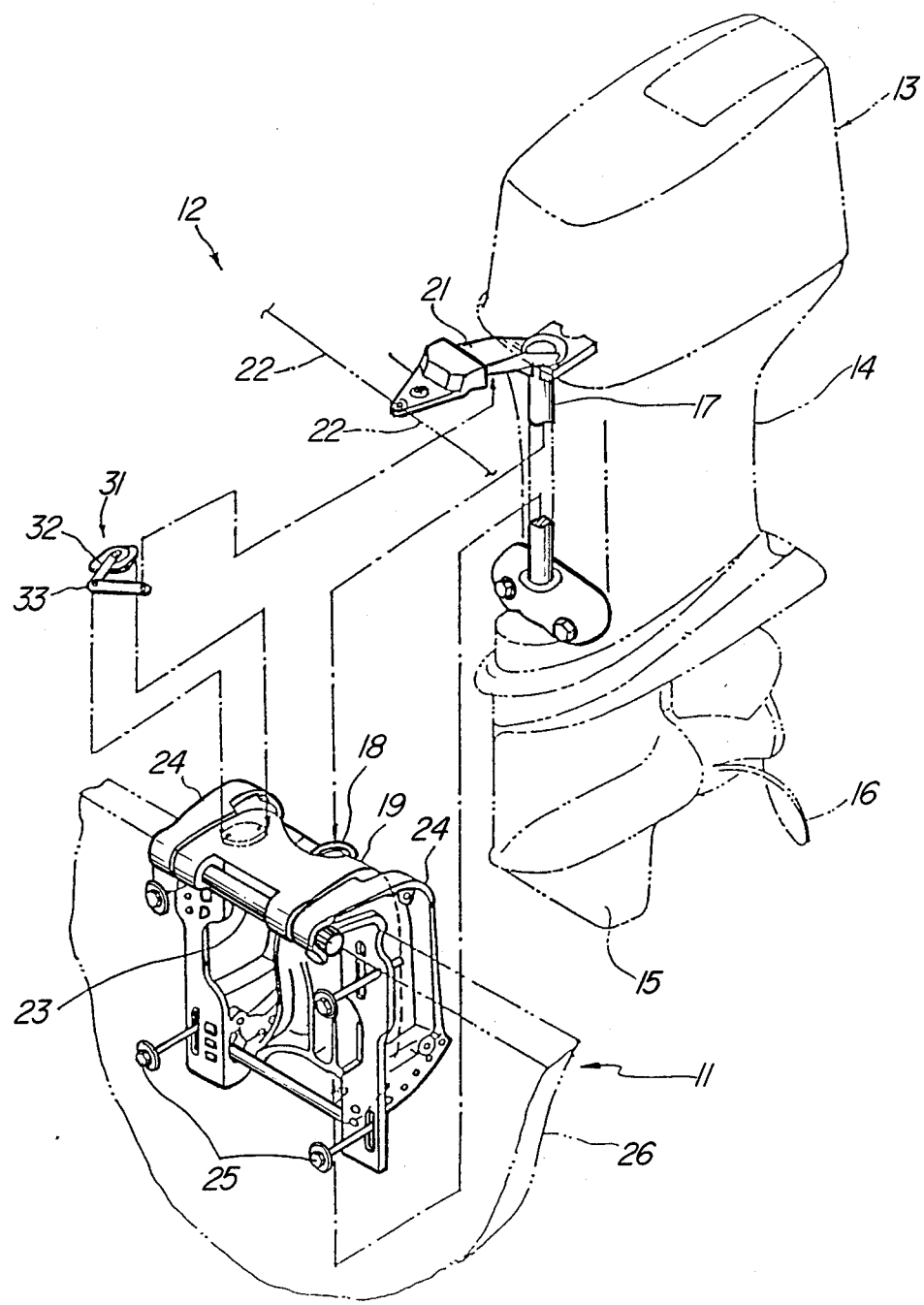
FIG. 2 is a partially exploded, perspective view of the outboard drive and steering angle sensor of the embodiment.

Referring first to FIGS. 1 and 2, a watercraft constructed in accordance with an embodiment of the invention is identified generally by the reference numeral 11. In the illustrated embodiment, the watercraft 11 is steered and powered by means of an outboard motor, indicated generally by the reference numeral 12. Although the invention is described in conjunction with an outboard motor powered watercraft, it is to be understood that the invention may be practiced with watercraft that are driven by an inboard/outboard drive or by means of a conventional inboard drive. The invention, however, has particular utility in connection with outboard drives be they the outboard drive of an inboard/outboard unit or an outboard motor per se.

The outboard motor 12 includes a power head 13 in which an internal combustion engine (only partially shown in FIG. 3) is supported. The engine drives a drive shaft (not shown) which is journaled, in a known manner, in a drive shaft housing 14 that depends from the power head 13. This drive shaft terminates within a lower unit 15 and drives a propeller 16 through a forward, neutral, reserve transmission (not shown) of any known type.

Referring now specifically to FIG. 2, a steering shaft 17 is affixed to the drive shaft housing 14 in a known manner and is journaled for steering movement in a bearing motion 18 of a swivel bracket 19. A steering arm 21 is affixed to the steering shaft 17 and is coupled by means of flexible cables or the like 22 to a steering mechanism (to be described).

The swivel bracket 19 is, in turn, pivotally connected by means of a pivot pin 23 to a clamping bracket 24. The clamping bracket 24, in turn, includes means, such as bolts 25, for affixing the outboard motor 12 to a transom 26 of the watercraft 11.

Referring again to FIG. 1, an operator and passenger's compartment 27 is provided forwardly of the transom 26. Positioned in the operator's compartment 27 is a steering wheel 28 which is connected to the cables 22 for steering the outboard motor 13 in a known manner. In addition, a combined shift, throttle control lever 29 is juxtaposed to the steering wheel 28 for adjusting the power output of the engine contained within the power head 13 and the shifting of the transmission contained within the lower unit 15.

It should be understood that the general construction of the watercraft 11 and its propulsion and steering is only described so that the environment of the invention can be understood. As has been previously noted, the invention can be used with a wide variety of watercrafts having different forms of propulsion and steering.

In accordance with the invention, means are provided for insuring against the simultaneous existence of more than a predetermined steering angle and more than a predetermined power output of the engine or acceleration of the watercraft 11. To this end, there is provided a steering angle sensor 31 (FIGS. 2 and 3) in the form of a variable resistor having a wiper arm 32 that is connected by means of a link 33 to the steering arm 21. The body of the resistor is affixed to the swivel bracket 19 so that the wiper arm 32 will rotate relative to the resistor upon steering movement of the outboard motor 12 about the axis defined by the steering shaft 17.

Figure 3:
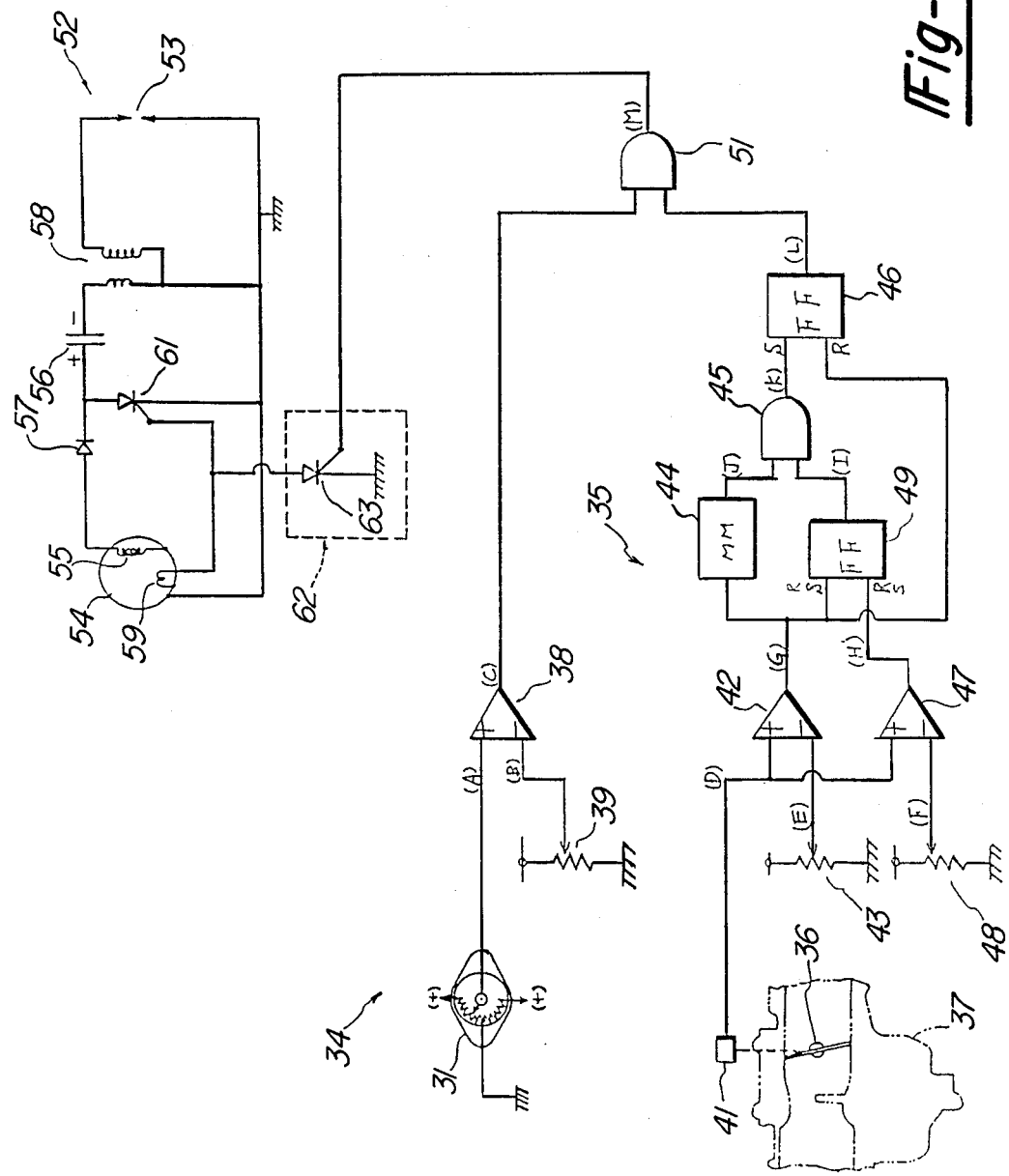
FIG. 3 is a schematic diagram of the control of this embodiment.

Referring now primarily to FIGS. 3 and 4, the control system for the unit will be described. This control system includes a steering angle sensing portion, indicated generally by the reference numeral 34, and including the steering angle sensor 31. There is also provided an engine output or acceleration sensing portion 35 which senses the engine acceleration. In the illustrated embodiment, acceleration is determined by sensing a rapid change in positiouit is indicated generally by the carburetor 37 for the engine contained within the power head 13 and previously referred to. It is to be understood, however, that acceleration can be sensed in other ways by means of an accelerometer or any other type of device used for this purpose.

The output A from the resistor 31 of the steering angle sensor 34 is inputted to one gate of a comparator 38. The other gate of the comparator 38 receives a fixed reference input signal B set by a resistor 39 such as a variable resistor. The comparator 38 is designed to provide an output signal C when the steering angle of the outboard motor 12 exceeds a predetermined value (A B). It will be noted from the example of FIG. 4 that the comparator 38 outputs the signal C when the steering angle exceeds the reference input B at the point in time a.

A throttle position sensor 41 is associated with the throttle valve shaft 36 and outputs a signal D that is indicative of the angle of opening of the throttle valve that is fixed to the throttle valve shaft 36. The throttle valve position sensor 41 may comprise a variable resistor like the steering angle sensor 31.

The output signal D from the throttle position sensor 41 is transmitted to a comparator 42 which compares the throttle position with a fixed minimum throttle position signal E generated by a resistor 43 such as a variable resistor. The comparator 42 compares the signals D and E, which are delivered to its gates and outputs a signal G when it is sensed that the throttle position is above a predetermined minimum throttle setting. This point in time is shown as the point in time b in FIG. 4.

The signal G outputted from the low throttle position comparator 42 is transmitted to a mono-stable multivibrator 44 which outputs a signal J to one gate of an AND circuit 45 for a period of time d−b. In addition, the signal G is transmitted to the reset gate of a flip-flop 46 for resetting the flip-flop when the predetermined low throttle position is first exceeded as sensed by the comparator 42.

The output signal D from the throttle position sensor 41 is also inputted to one gate of a high speed comparator 47. This signal is compared with a fixed reference signal F obtained from a resistor 48 such as a variable resistor to determine when a predetermined high throttle setting is exceeded. At this time (c in the illustrated example), a signal H will be outputted from the comparator 47. It should be noted that the resistors 31, 39, 41, 43 and 48 are all connected to the same power source.

The signal H is transmitted to a set gate of a flip-flop 49 for changing its state and outputting a signal I to the other terminal of the AND gate 45. If the signal I appears at its gate of the AND circuit 45 within a time interval in which the multivibrator 44 is still outputting its signal J, the AND gate 45 will output a signal K to a set gate of the flip-flop 46.

Thus, if the throttle valve shaft 36 is rotated to open the throttle valve rapidly at a time interval less than the time interval d−b, for example, at the time c, then the flip-flop 46 will be set and will output a signal L to a further AND gate 51. If the signal L exists at the same time that more than a predetermined steering angle exists as indicated by the output C of the comparator 38, which is transmitted to the other gate of the AND circuit 51, the AND circuit 51 will output a signal M for slowing the speed of the watercraft.

The way in which the speed of the watercraft may be reduced so as to prevent excessive acceleration when more than a predetermined steering angle exists is accomplished in the illustrated embodiment by interrupting or killing the ignition circuit of the engine. It is to be understood, however, that various other means for reducing acceleration such as closing the throttle valve. Various other arrangements for reducing the speed of the watercraft will be apparent to those skilled in the art.

The engine ignition circuit is indicated generally by the reference numeral 52 and is provided for firing a spark plug 53. In the illustrated embodiment, the ignition circuit 52 is of the capacitor discharge type and includes a magneto generator including a rotating magnet 54 that is driven by the engine output shaft. The magnet 54 cooperates with a charging coil 55 for charging a capacitor 56 through a diode 57 upon rotation of the magnet 54. The capacitor 56 is in circuit with the primary winding of a step up transformer 58.

At a predetermined position of the crankshaft, the rotating magnet 54 comes into proximity to a pulser coil 59 which is in circuit with the gate of an SCR 61 which then becomes conductive. When the SCR 61 becomes conductive, the capacitor 56 is permitted to discharge to the ground and the spark plug 53 will be fired.

Misfiring and reducing of engine speed is achieved by means of a misfiring circuit, indicated generally by the reference numeral 62. The misfiring circuit 62 includes an SCR 63 that is capable of grounding the gate of the SCR 61 when SCR 63 becomes conductive. The SCR 63 is rendered conductive by the output signal M from the AND gate and then will prevent firing of the spark plug 53 and reduce the engine speed. This may be accomplished either by completely interrupting the ignition for the spark plug 53 or only periodically interrupting it. As has been previously noted, other ways of reducing acceleration of the watercraft can also be employed.

The aforedescribed condition exists when the throttle valve associated with the throttle valve shaft 36 is opened rapidly so that the passage of the low throttle position point and the high throttle position point, as set by the resistors E and F, occurs in less than the time d−b. If, however, the acceleration is more gradual as shown in the dotted line curve in FIG. 4, the signal H from the comparator 47 will not occur at the same time that the multivibrator 44 is still outputting its signal J and hence the AND circuit 45 will not output an output signal and the gradual acceleration will be permitted.

If the operator closes the throttle valve associated with the throttle valve shaft 36 sufficient so that it passes below the point at which the comparator 47 outputs its signal, the signal H to the flip-flop 49 will be terminated. However, the state of the flip-flop 49 will not be changed and it will continue to maintain the state of the output signal I. However, the time set by the multivibrator circuit 44 will have elapsed and there will be no signal J to cause the AND circuit 45 to output a signal.

If the throttle valve associated with the shaft 36 continues to be closed past the point at which the comparator 42 outputs a signal (point e), then the comparator 42 will no longer output its signal G. Hence, the interruption of the ignition circuit will be stopped and the system is ready for resetting the next time the throttle valve associated with the shaft 36 is opened beyond the predetermined low throttle setting determined by the comparator 42.

It should also be noted that any time the steering angle as set by the steering angle sensor 31 falls below the preset steering angle (point f), the comparator 38 will cease its output and the AND circuit 51 will not transmit the signal M so as to interrupt the ignition. Therefore, the interruption of the ignition or stopping of it can be discontinued either through a reduction of the steering angle or a closing of the throttle valve below the low throttle setting determined by the comparator 42.

In addition to the illustrated and described embodiment, the invention is capable of being utilized in a wide variety of applications. In fact, in addition to being employed with watercraft, it also may be utilized in connection with other types of vehicles such as wheeled vehicles. Although the invention has particular utility in a watercraft, it also can be utilized in a land vehicle and particularly one in which the driven wheel is also the steered wheel. Various other changes and modifications may be made without departing from the spirit and scope of the invention, as defined by the appended claims.

What is claimed is:

1. In a watercraft having a drive carrying propulsion means and supported for pivotal movement about a steering axis, an engine for driving said propulsion means, means for sensing the acceleration of said watercraft, and means for limiting the degree of acceleration of said watercraft when said drive is steered through greater than a predetermined angle.

2. In a watercraft as set forth in claim 1 wherein the predetermined angle is measured by means for sensing the pivotal movement of the drive about the steering axis.

3. In a watercraft as set forth in claim 2 wherein the means for limiting the acceleration of said watercraft comprises means for limiting the engine power.

4. In a watercraft as set forth in claim 3 wherein the acceleration of the watercraft is sensed by sensing the rate of change of the engine throttle valve position.

5. In a watercraft as set forth in claim 1 wherein the output of the engine is varied to limit the acceleration of the watercraft.

6. In a watercraft as set forth in claim 5 wherein the acceleration is sensed by sensing the rate of acceleration.

7. In a watercraft as set forth in claim 6 wherein the acceleration is sensed by sensing the rate of change of the throttle opening of the engine.

8. In a watercraft as set forth in claim 7 wherein the means comprises a first comparator for comparing the throttle opening with a predetermined minimum throttle opening and a second comparator for comparing the throttle opening with a predetermined higher throttle opening and means including a timing circuit for sensing when the throttle is opened to the higher position within a predetermined time at which the throttle is opened to the lower position and outputting a power decreasing signal at that time.

9. In a watercraft as set forth in claim 1 wherein the engine is of the spark ignited type and the acceleration is limited by interrupting the spark.

10. In a watercraft as set forth in claim 9 wherein the acceleration is sensed by sensing the rate of change of the throttle opening of the engine.

11. In a watercraft as set forth in claim 10 wherein the acceleration sensor comprises a first comparator for comparing the throttle opening with a predetermined minimum throttle opening and a second comparator for comparing the throttle opening with a predetermined higher throttle opening and means including a timing circuit for sensing when the throttle is opened to the higher position within a predetermined time at which the throttle is opened to the lower position and outputting a power decreasing signal at that time.

12. In a vehicle having steering means for steering the vehicle, first control means for controlling said steering means, an engine for powering said vehicle, second control means for controlling the acceleration of said vehicle, and safety means for controlling at least one of said control means for precluding the existence of more than a predetermined steering angle and more than a predetermined vehicle acceleration without inhibiting acceleration less than said predetermined amount.

13. In a vehicle as set forth in claim 12 wherein the safety means is responsive to means for sensing the acceleration of the vehicle.

14. In a vehicle as set forth in claim 13 wherein the power of the engine is limited by the safety means.

15. In a vehicle as set forth in claim 12 wherein the safety means controls only the second control means.

16. In a vehicle as set forth in claim 15 wherein the second control means controls a throttle valve of the engine.

17. In a vehicle as set forth in claim 16 wherein the safety means comprises a first comparator for comparing the throttle opening with a predetermined minimum throttle opening and a second comparator for comparing the throttle opening with a predetermined higher throttle opening and means including a timing circuit for sensing when the throttle is opened to the higher position within a predetermined time at which the throttle is opened to the lower position and outputting a power decreasing signal at that time.

* * * * *